"" US008477909B2

(12) United States Patent  (10) Patent No.: US 8,477,909 B2
Poi et al.  (45) Date of Patent: Jul. 2, 2013

(54) TESTING CALL ROUTING

(75) Inventors: Parind Poi, Lewisville, TX (US);
Prashant Desai, Land O Lakes, FL (US); Mayuresh Hegde, Irving, TX (US); Juan Vasquez, Tampa, FL (US); Haridas Bhogade, Plant City, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 347 days.

(21) Appl. No.: 12/856,853

(22) Filed: Aug. 16, 2010

(65) Prior Publication Data

US 2012/0039448 A1  Feb. 16, 2012

(51) Int. Cl.
H04M 1/24 (2006.01)
H04M 3/08 (2006.01)
H04M 3/22 (2006.01)

(52) U.S. Cl.
USPC ..................................... 379/10.02; 379/26.01

(58) Field of Classification Search
USPC .................. 379/1.01, 10.02, 26.01, 27.02
See application file for complete search history.

(56) References Cited

U.S. PATENT DOCUMENTS

| | | | | |
|---|---|---|---|---|
| 7,388,946 | B1 * | 6/2008 | Mussman et al. | 379/15.01 |
| 7,436,936 | B2 * | 10/2008 | Terpstra et al. | 379/27.01 |
| 2007/0291905 | A1 * | 12/2007 | Halliday et al. | 379/1.01 |
| 2008/0144786 | A1 * | 6/2008 | Wang et al. | 379/88.18 |

* cited by examiner

*Primary Examiner* — Quoc D Tran

(57) ABSTRACT

A device may automatically place a call to a call routing device based on one of a list of numbers or addresses. The call may be forwarded by the call routing device to a call agent device. The device may also establish a session with the call agent device to which the call is forwarded by the call routing device and automatically receive, from the call agent device, a message that includes an identifier for a virtual call agent. The device may extract the identifier from the received message, compare the extracted identifier to an identifier that is associated with the call, and determine whether the call routing device correctly forwarded the call based on the comparison.

20 Claims, 6 Drawing Sheets

TESTING CALL ROUTING

BACKGROUND

When a user calls an interactive voice response (IVR) system, the user may use dual tone multi-frequency (DTMF) tones to perform various functions, such as navigating a menu tree to receive a service, purchasing a product, accessing information, and/or connecting to one of multiple agents attending a call center. More advanced IVR systems may rely on speech recognition subsystems in place of or in addition to DTMF signaling to provide similar functionalities.

DETAILED DESCRIPTION

The following detailed description refers to the accompanying drawings. The same reference numbers in different drawings may identify the same or similar elements. As used herein, the term "call forwarding" may include establishing a session between the calling party and a party to which the call is forwarded from the called party. In some instances, forwarding may include terminating a session, if it exists, between the caller and called party. At a call center, a device may forward inbound calls to call center agents (e.g., sales person, technical support agent, software agent, etc.).

Figure 1:
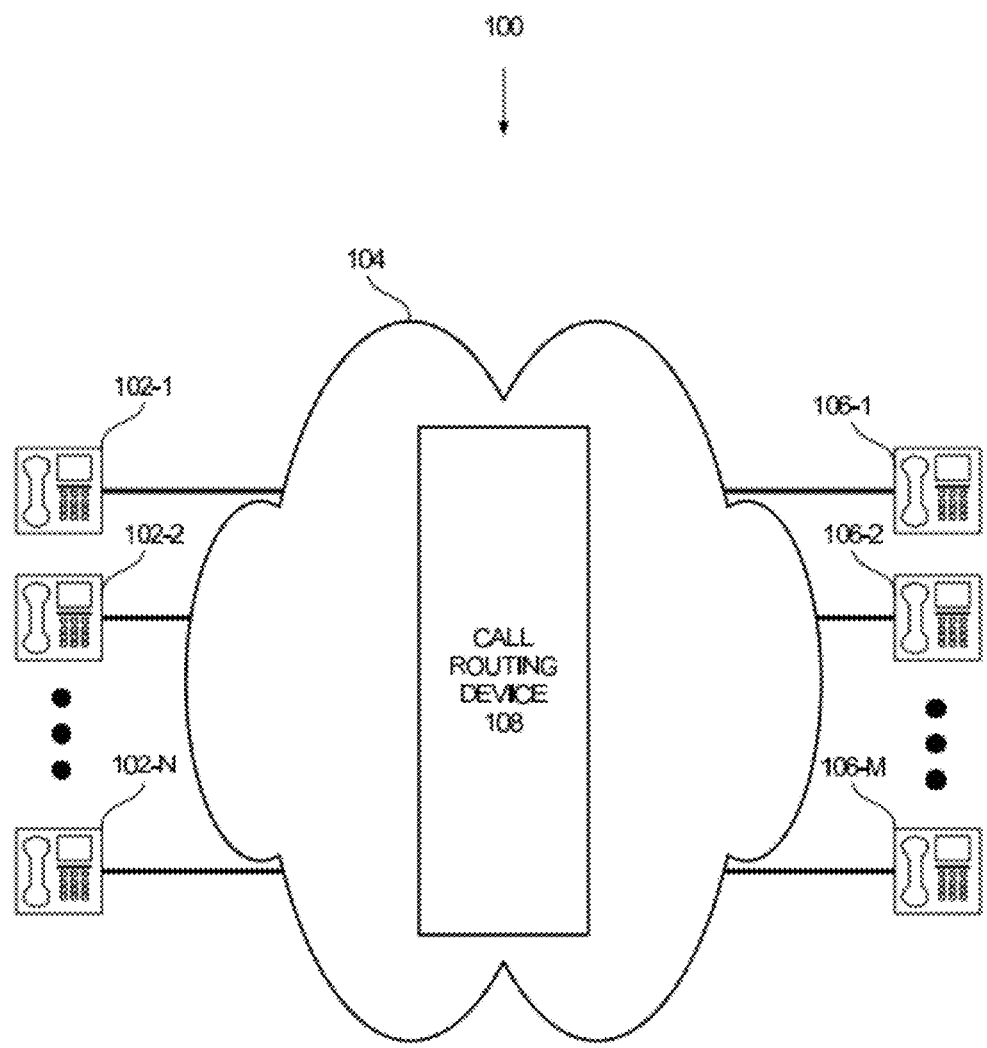
FIG. 1 illustrates exemplary call routing at an exemplary call center.

As described below, a system may automatically test a call routing device. FIG. 1 illustrates an exemplary routing function of an exemplary call routing device 108. As shown, network 100 may include caller devices 102-1 through 102-N (referred to as "caller device 102" or "caller devices 102"), a network 104 which includes call routing device 108, and call agent devices 106-1 through 106-M (referred to as "call agent device 106" or "call agent devices 106"). Although caller devices 102 and call agent devices 106 are illustrated as telephones, in an actual implementation, devices 102 and 106 may include soft phones (e.g., an IP phone application installed on a computer) as well as telephones.

Caller device 102 may call a call center that includes call routing device 108. Caller device 102 may call the call center to receive a customer service, access information, purchase a product or a service, etc.

Network 104 may include one or more public switched telephone networks (PSTNs) or another type of switched network (e.g., an optical network). Network 104 may also include a number of transmission towers for receiving wireless signals and forwarding the signals toward the intended destination. Network 104 may further include one or more packet switched networks, such as an Internet protocol (IP) based network, a local area network (LAN), a wide area network (WAN), a personal area network (PAN), an intranet, the Internet, or another type of network (e.g., a satellite-based network) that is capable of exchanging information.

As further shown, network 104 may include call routing device 108. In some implementations, call routing device 108 may reside in a call center or at a remote location connected to the call center over an IP network. Call routing device 108 may receive calls, park calls, guide calls through menus, and/or route (e.g., forward) the calls to available call agent devices 106. Call agent device 106 may connect to caller device 102 via call routing device 108. Accordingly, the caller and the call center agent may conduct different types of transactions.

Call routing device 108, in routing calls, needs to correctly map the called number (e.g., a number that calling device dialed to reach call routing device 108) or an address (e.g., network address) to a particular set of call agent devices 106. Call routing device 108 may call an incorrect number, for example, due to a bad configuration, hardware bug, software bug, etc. Because call routing device 108 can map thousands of numbers to call agent devices 106, testing the accuracy of caller routing device 108's routing function, by dialing each of the numbers/addresses that call routing device 108 handles, can be time consuming and expensive.

In implementations described herein, a system may automatically test call routing device 108. In the system, a call testing device may automatically call each of a given list of numbers, addresses, etc. The calls are routed or forwarded by call routing device 108 to a call agent device that emulates call agents (e.g., provides virtual call agents). For each of the calls, when a communication session is established between the call testing device and the call agent device, the call agent device may send a message that conveys an identifier for a virtual call agent to the call testing device. The call testing device may obtain the identifier and/or other types of information from the message. The call testing device may then determine, based on the identifier, whether calling the number/address reached the correct virtual agent, and consequently, determine whether call routing device 108 correctly forwarded the call.

Figure 2:
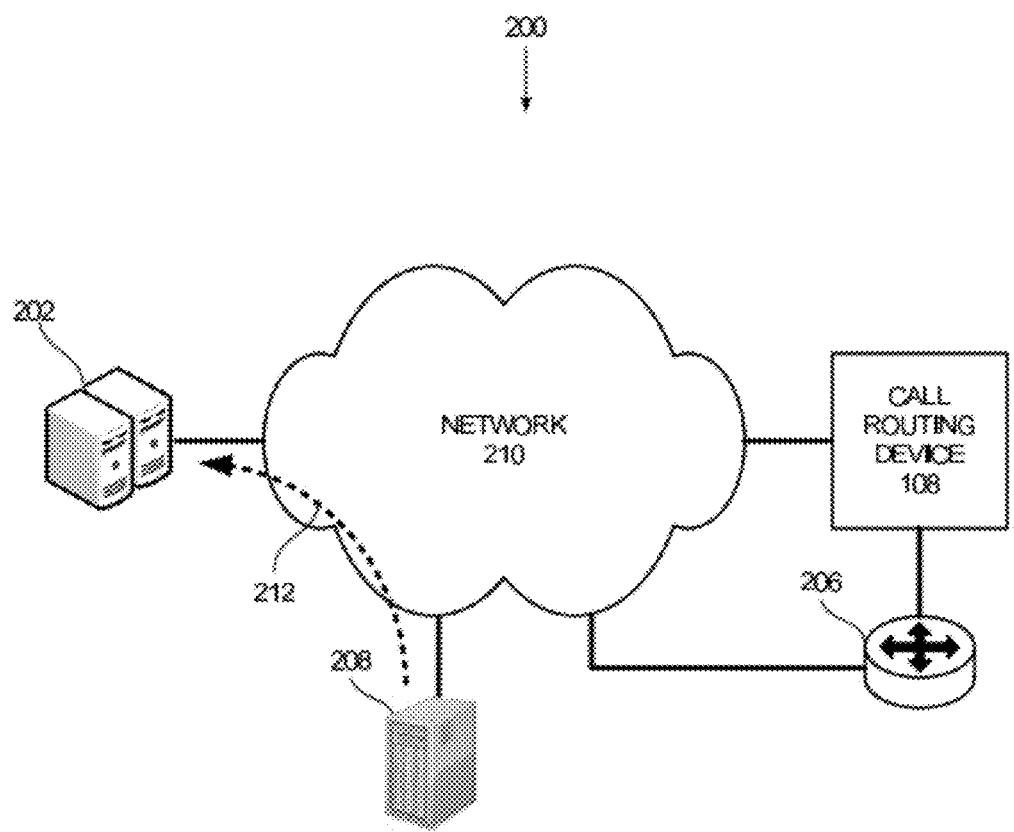
FIG. 2 illustrates an exemplary system in which concepts described herein may be implemented.

FIG. 2 illustrates an exemplary system 200 in which concepts described herein may be implemented. As shown, system 200 may include a call testing device 202, call routing device 108 (the device under test (DUT)), gateway 206, call agent device 208, and network 210. Depending on the implementation, system 200 may include additional, fewer, different, or different arrangement of devices than those illustrated in FIG. 2. In addition, although the devices in system 200 may test different types of calls, e.g., plain-old telephone systems (POTS) calls, H.323 calls, Session Initiation Protocol (SIP) calls, videophone calls, videoconference calls, text messaging sessions, etc., in the following discussion, for simplicity, the devices may be described in terms of testing SIP calls.

Call testing device 202 may call each of a list of numbers/addresses (e.g., approximately 5000 numbers, network addresses, etc.). Each of the calls from call testing device 202 may be received at call routing device 108 and forwarded to call agent device 208. For each forwarded call, when call agent device 208 establishes a communication session with call testing device 202, call agent device 208 may send information that identifies a virtual agent that would have received the call to call testing device 202. Based on the information, call testing device 202 may determine whether the call has been correctly routed by call routing device 108 (e.g., whether call routing device 108 sent correct information to call agent device 208).

Call routing device 108 may include an automatic call director (ACD), Private Branch Exchange (PBX), and/or another type of call routing device. Call routing device 108 may route/forward each of the calls received from call testing device 202 to call agent device 208. In one implementation, in forwarding or routing a call to call agent device 208, call routing device 108 may pass call attributes that identify a virtual agent. The information may include, for example, call type (e.g., billing information), information provided by the caller (e.g., selected menu items DTMF or speech recognition), caller telephone number or address, etc.

In some embodiments, call routing device 108 may forward SIP calls or H.323 calls from call testing device 202. In such embodiments, depending on the implementation, call routing device 108 may be configured to perform routing/forwarding in one of several different ways. For example, in one implementation, call routing device 108 may route an INVITE message of a SIP call to call agent device 208. In such an implementation, call routing device 108 may modify the SIP INVITE message to include call attributes.

In other implementations, for each call, call routing device 108 may perform a lookup, based on the number (e.g., phone number) called by call testing device 202 and/or a destination address (e.g., layer 3 address) for the INVITE message. In one implementation, the destination address may be the network address of call agent device 208, and consequently, all calls from call testing device 202 may be routed to call agent device 208.

In yet another implementation, call routing device 108 may perform a lookup similar to the one described for the previous implementation, to route an INVITE message for each call. In contrast to the previous implementation, however, destination addresses that call routing device 108 identifies for calls may not be identical. For example, assume that call testing device 202 calls 800-202-2343 and 800-304-9283. Accordingly, call routing device 108 may look up different destination addresses for the INVITE messages. However, once the INVITE messages leave call routing device 108 and arrive at gateway 206, gateway 206 may reroute the INVITE messages to call agent device 208. This way, all SIP test calls from call testing device 202 are forwarded to call agent device 208.

In some implementations, call routing device 108 may be capable of parking incoming SIP calls to emulate, for example, temporary unavailability of call agents. In such instances, for each call that is not forwarded immediately, call routing device 108 may establish a communication session with call testing device 202. When call routing device 108 determines that a call agent has become available and the call can be forwarded to the call agent, call routing device 108 may determine a destination address for a forwarding message (e.g., a SIP REFER message). As described above, the destination addresses for different calls may be the address of call agent device 208, or, alternatively, different destination addresses for virtual call agents. In the latter instances, gateway 206 may intercept the forwarding messages and redirect the calls to call agent device 208.

Gateway 206 may intercept routed or forwarded SIP/H.323 messages from call routing device 108 to call agent device 208. For some call routing device 108 configurations in which the destination addresses of the routed calls is the network address of call agent device 208, gateway 206 may be optional (e.g., omitted from network 200).

Call agent device 208 may receive calls that are placed by call testing device 202 and forwarded via call routing device 108. In some embodiments, for each of the forwarded calls, call agent device 208 may receive a SIP message that establishes a real-time protocol (RTP) link between call agent device 208 and call testing device 202. FIG. 2 shows an exemplary RTP link that is established between call agent device 208 and call testing device as dotted arrow 212.

In addition, for each of the forwarded calls, call agent device 208 may determine, based on the information (e.g., call attributes) received from call routing device 108, a virtual agent to which the call is forwarded. In some implementations, the information may be provided in a SIP INVITE message associated with the forwarded call. Call agent device 208 may send information that identifies the virtual agent to call testing device 202 over the established RTP link.

Network 210 may include one or more public switched telephone networks (PSTNs), packet switched networks, such as an Internet protocol (IP) based network, a local area network (LAN), a wide area network (WAN), a personal area network (PAN), an intranet, the Internet, or another type of network. The composition of network 210 may depend on scope and/or the configuration of the test being conducted by devices 202 through 208. For example, in a laboratory setting, network 210 may include a LAN. In a field test, network 210, for example, may include network 100.

Figure 3:
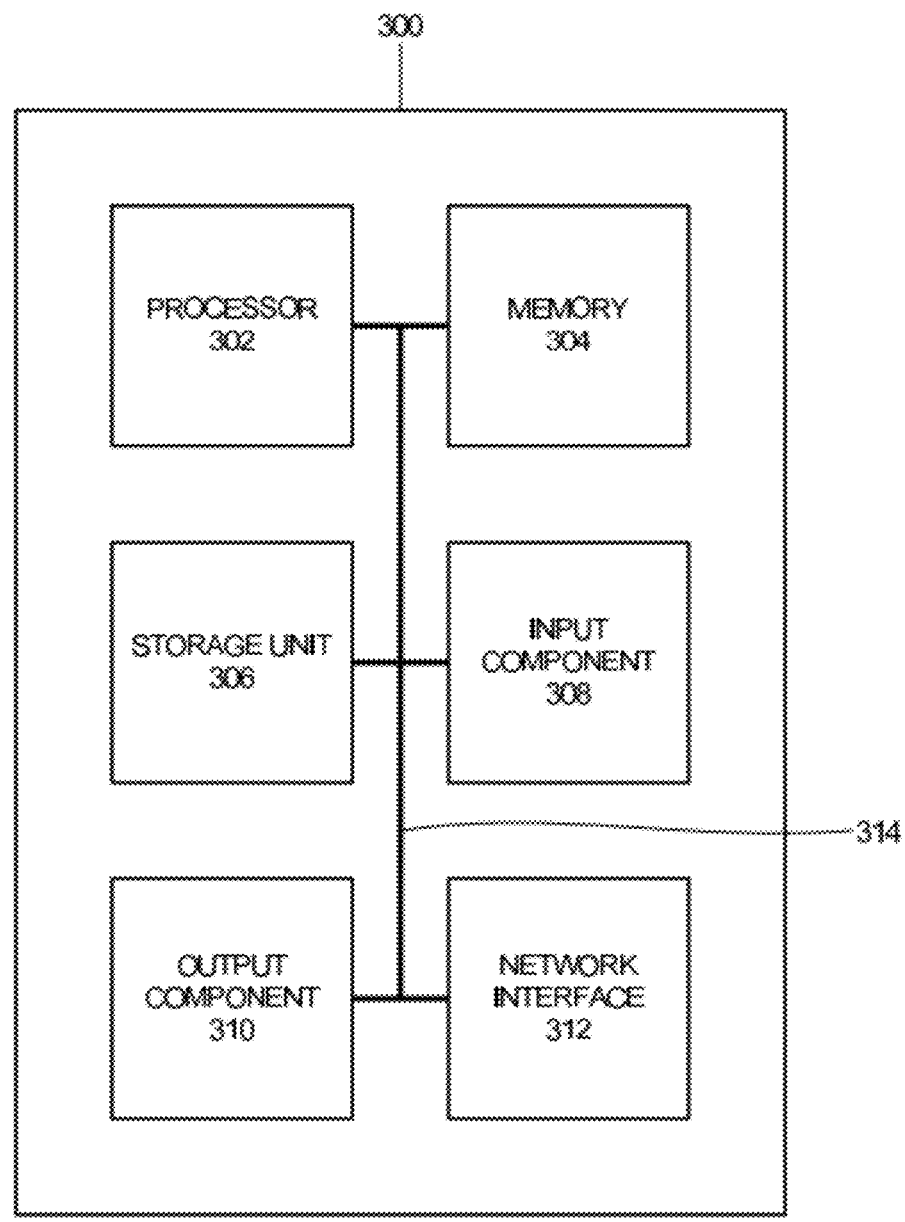
FIG. 3 is a block diagram of exemplary components of an exemplary network device of FIG. 2.

FIG. 3 is a block diagram of an exemplary network device 300, which may correspond to one or more of devices 202, 108, 206, and 208. As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards for connecting to external buses.

Processor 302 may include a processor, a microprocessor, an Application Specific Integrated Circuit (ASIC), a Field Programmable Gate Array (FPGA), and/or other processing logic (e.g., embedded devices) capable of controlling network device 300. Memory 304 may include static memory, such as read only memory (ROM), and/or dynamic memory, such as random access memory (RAM), or onboard cache, for storing data and machine-readable instructions (e.g., programs, scripts, etc.). Storage unit 306 may include a floppy disk, CD ROM, CD read/write (R/W) disc, and/or flash memory, as well as other types of storage devices (e.g., hard disk drive) for storing data and/or machine-readable instructions (e.g., a program, script, etc.).

Input component 308 and output component 310 may provide input and output from/to a user to/from network device 300. Input/output components 308 and 310 may include a display screen, a keyboard, a mouse, a speaker, a microphone, a camera, a DVD reader, Universal Serial Bus (USB) lines, and/or other types of components for converting physical events or phenomena to and/or from signals that pertain to network device 300.

Network interface 312 may include a transceiver (e.g., a transmitter or receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting network device 300 to other devices (e.g., a Bluetooth interface).

Communication path 314 may provide an interface through which components of network device 300 can communicate with one another.

Figure 4:
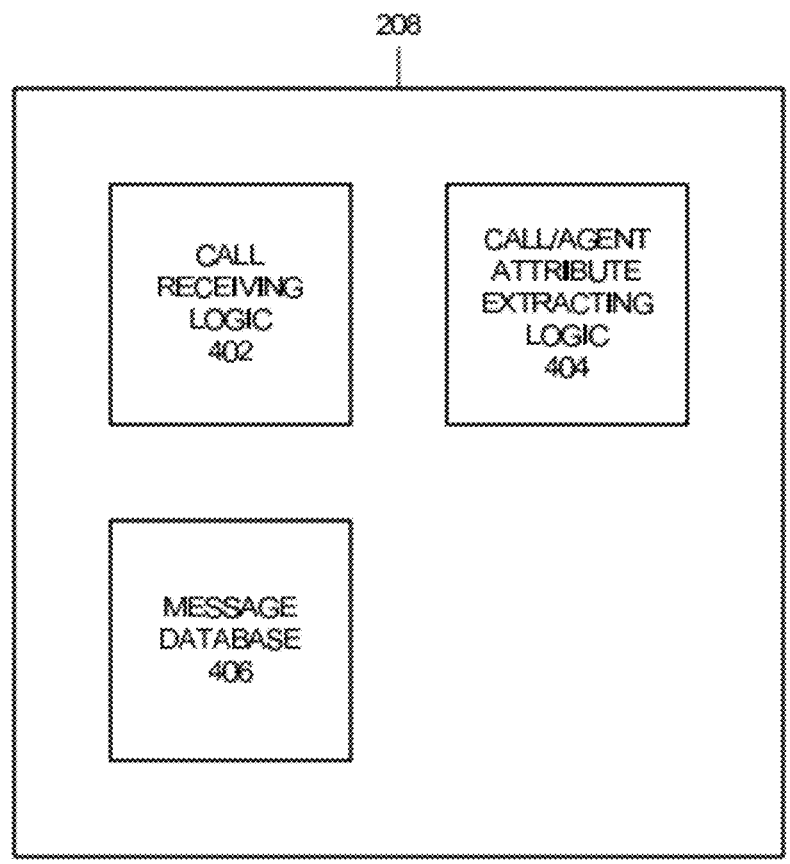
FIG. 4 is a block diagram of exemplary functional components of an exemplary call agent device of FIG. 2.

FIG. 4 is a block diagram of exemplary functional components of call agent device 208. As shown, call agent device 208 may include call receiving logic 402, call/agent attribute extracting logic 404, and a message database 406. Depending on the implementation, call agent device 208 may include additional, fewer, different, or different arrangement of components than those illustrated in FIG. 4. In addition, although call agent device 208 may include other functional components (e.g., device drivers, thread management logic, a file manager (e.g., logical volume manager), transport control protocol (TCP)/IP stacks, an operating system, a web server, etc.), for simplicity, they are not illustrated in FIG. 4.

Call receiving logic 402 may receive forwarded calls from call routing device 108. In one implementation, call receiving logic 402 may receive an SIP INVITE message and/or another message conveying call attributes. In response, call receiving logic 402 may establish an RTP session (e.g., session 212) with call testing device 202 from which the call originated.

When call receiving logic 402 receives a forwarded call from call routing device 108, call receiving logic 402 may determine an agent identifier associated with the call (e.g., determine a virtual call agent to which the call is forwarded) via call/agent attribute extracting logic 404 (described further below). In addition, call receiving logic 402 may emulate the agent by selecting, from message database 406, a message that the virtual call agent would have played and send the message to call testing device 202.

Call/agent attribute extracting logic 404 may determine call/agent attributes associated with a call that is forwarded or routed to call receiving logic 402. Examples of call/agent attributes may include a telephone number (e.g., a number of the called party or caller party), an account number, information that call routing device 204 may have received from call testing device 202, etc. In one implementation, when call receiving logic 402 receives a forwarded SIP INVITE message, call/agent attribute extracting logic 404 may scan the INVITE message to extract the call attributes and determine an identifier of a virtual agent that is to receive the message.

Message database 406 may include messages that correspond to call attributes and/or virtual agent identifiers. When call/agent attribute extracting logic 404 obtains call attributes, call receiving logic 402 may look up, in message database 406, a message that corresponds to the call attributes and/or the obtained virtual agent identifier. For example, assume that call/agent attribute extracting logic 404 obtains "2000" from an INVITE message. Call receiving logic 402 may use 2000 as a key to look up a corresponding voice message in message database 406. Each message that corresponds to a virtual identifier may include information/data from which call testing device 202 can determine/extract the corresponding agent identifier when call testing device 202 receives the message.

As mentioned above, when call receiving logic 402 establishes a communication with call testing device 202, call receiving logic 402 may transmit the message obtained from message database 406 (e.g., speech corresponding to the extracted/obtained agent identifier) over the established session. In a different embodiment, the forwarded call may be a text messaging session. Upon retrieving a message from message database 406, call receiving logic 402 may send the message as a text string over the session. Once the message is transmitted (e.g., a speech signal, a text string, etc.) to call testing device 202, call receiving logic 402 may terminate the session (and therefore the call).

Figure 5:
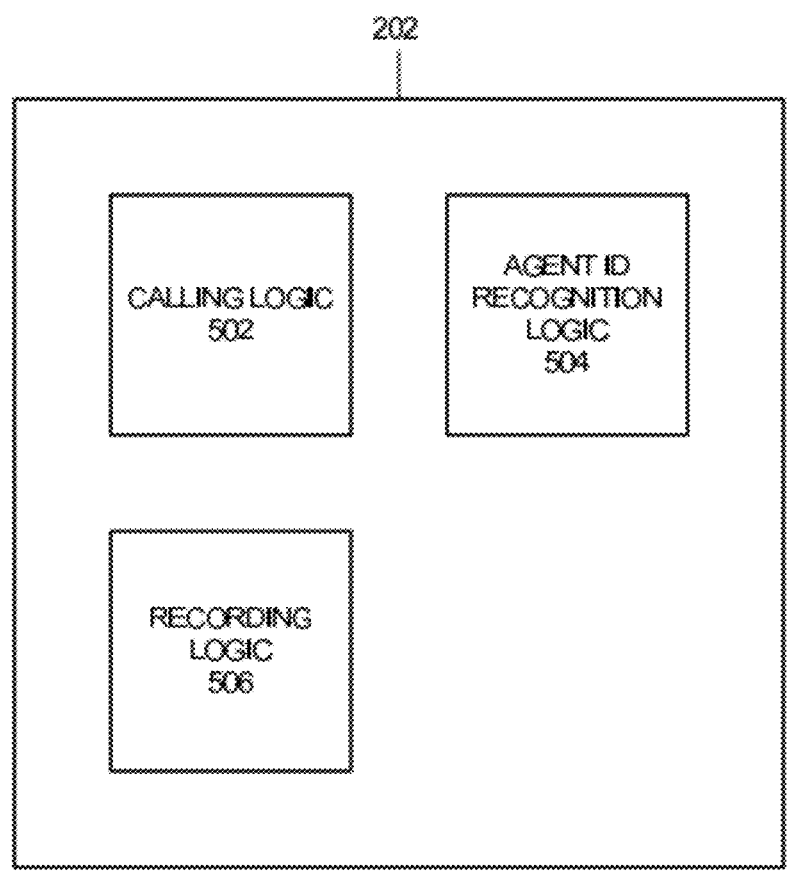
FIG. 5 is a block diagram of exemplary functional components of an exemplary call testing device of FIG. 2.

FIG. 5 is a block diagram of exemplary functional components of an exemplary call testing device 202. As shown, call testing device 202 may include calling logic 502, agent ID recognition logic 504, and recording logic 506. Depending on the implementation, call testing device 202 may include additional, fewer, different, and different arrangement of devices than those illustrated in FIG. 5. In addition, although call testing device 202 may include other functional components, for simplicity, they are not illustrated in FIG. 5.

Calling logic 502 may call each of a list of numbers/addresses to test the routing function of call routing device 108. The calls may include POTS calls, videophone calls, text sessions, etc. In some implementations, for each of the calls, calling logic 502 may send a SIP INVITE message to call routing device 108. For each SIP call, when call routing device 108 forwards the call to call agent device 208, calling logic 502 may establish a RTP session with call agent device 208. Over the RTP session, calling logic 502 may receive a message that corresponds to call attributes or an agent identifier from call agent device 208. Calling logic 502 may determine whether call routing device 108 correctly routed its call to call agent device 208 by determining the call attributes/agent identifier based on the received message and comparing the determined agent identifier/call attributes with another agent identifier/call attributes (e.g., a locally or remotely stored agent identifier/call attributes) that is associated with the original call.

In some implementations, call agent device 208 may send a text message that corresponds to an agent identifier/call attributes. In other implementations, call agent device 208 may send speech data that corresponds to the agent identifier/call attributes. In these implementations, calling logic 502 may extract/determine agent identifiers/call attributes via agent ID recognition logic 504.

Agent ID recognition logic 504 may recognize symbols, words, digits, etc., in a message, and may obtain an agent identifier/call attributes from a message that is received by calling logic 502. In some instances, agent ID recognition logic 504 may extract text (e.g., alphanumeric and/or symbol strings) from the message. In other instances, agent ID recognition logic 504 may apply speech recognition to the message to determine the agent identifier/call attributes that are sent from call agent device 208.

Recording logic 506 may write (e.g., in a file), for each call, a record of the call made by calling logic 502 (e.g., a dialed number, a network address to which a message is sent, etc.) and an agent identifier/call attributes that is determined/extracted from a message received from call agent device 208. For example, assume that calling logic 502 called 800-253-2423, and that agent ID recognition logic 604 identified 2423 from a message received from call agent device 208. Consequently, recording logic 506 may write "800-253-2423: 2000" into a file.

A network operator/call tester (e.g., a software component or a person) may review the records generated by recording logic 506 to obtain error statistics or to identify numbers or addresses that caused call routing device 108 to incorrectly forward calls, etc.

Figure 6:
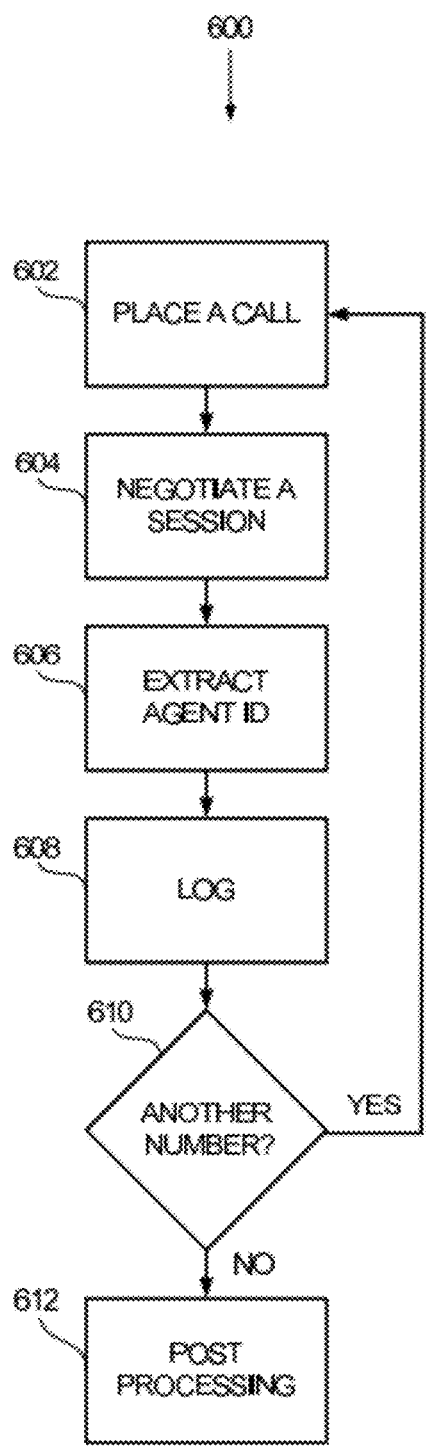
FIG. 6 is a flow diagram of an exemplary process for testing the exemplary call routing device of FIG. 2.

FIG. 6 is a flow diagram of an exemplary process 600 for testing call routing device 108. Process 600 may begin with call testing device 202 placing a call to call routing device 108 (block 602). Call testing device 202 may place different types of calls, as described above (e.g., POTS calls via a PSTN, instant messaging sessions, videophone calls, SIP VoIP calls, H.323 session, etc.). For SIP calls, call testing device 202 may send SIP INVITE messages to call routing device 108.

When call routing device 108 receives the call, call routing device 108 may route the call based on the number/address to which the call is made and/or additional information provided by call testing device 202. For example, when call routing device 108 receive a SIP INVITE message, call routing device 108 may look up a destination address based on the number/address indicated in the INVITE message. Call routing device 108 may then forward the call to call agent device 208. As described above, call routing device 108 may forward the call to call agent device 208 in one of several ways, depending on the implementation (e.g., dispatch a REFER message to call testing device 202, forward the SIP message in a packet(s) addressed to call agent device 208, etc.).

Once the call is forwarded to call agent device 208, call testing device 202 and call agent device 208 may negotiate a communication session between one another (block 604). In the case of a SIP call, call testing device 202 and call agent device 208 may negotiate a RTP session between the two devices. Once a session is established, call agent device 208 may send, to call testing device 202, a message (e.g., message in message database 406) that corresponds to an agent identifier or call attributes extracted from the forwarded call.

In sending the message, call agent device 208 may use one of several methods, depending on the type of call that was originally placed by call testing device 202. For example, when a SIP VoIP call is forwarded to call agent device 208, call agent device 208 may convert the message into speech data and stream the speech data to call testing device 202 over an RTP session. If the message from message database 406 is already speech data, call agent device 208 may simply stream the message.

When call testing device 202 has originally initiated an instant messaging session and the message is text data, call agent device 208 may send the message as text data to call testing device 202. When the call testing device 202 has placed a videophone call, call agent device 208 may send a video or speech data obtained from message database 406 and stream the video/speech data.

When call testing device 202 receives the message that conveys the agent identifier from call agent device 208, call testing device 202 may extract/determine the agent identifier and/or call attributes (block 606). For example, if the negotiated session (see block 604) includes a chat session, the agent identifier may be read from the received data as a text message. If the established session is a VoIP session or a videoconference session, call testing device 202 may apply speech recognition and/or image recognition to the received data to extract the agent identifier/call attributes. Once the message is received from call agent device 208, call agent device 208 or call testing device 202 may terminate the session.

Call testing device 202 may log the extracted/determined agent identifier/call attribtues along with the original number/address called by call testing device 202 (block 608). In some implementations, call testing device 202 may also record additional information, such as whether the agent identifier extracted/determined from the message is the same an agent identifier that is associated with the original number/address to which the call was made, the time of the call, etc.

At block 610, if there is yet another number/address to call (block 610—YES), call testing device 202 may return to block 602 to place and process another call. Otherwise (block 610—NO), call testing device 202 may perform post processing (block 612). The post processing may include alerting a tester (e.g., a person or a program), calculating successful call statistics, marking records with a failed test result (e.g., an agent ID for the called number/address and the received agent ID do not match), etc.

In the foregoing description, system 200 may automatically test call routing device 108. Call testing device 202 may automatically call each of a given list of numbers/addresses. The calls are routed by call routing device 108 to a hardware/software agent. When a communication session is established between call testing device 202 and call agent device 208, call agent device 208 may send a message to call testing device 202. Call testing device 202 may obtain an agent identifier/call attributes from the received message and use the received agent identifier/call attributes to verify that the call has been correctly routed.

The foregoing description of implementations provides illustration, but is not intended to be exhaustive or to limit the implementations to the precise form disclosed. Modifications and variations are possible in light of the above teachings or may be acquired from practice of the teachings.

For example, in the above description, call testing device 202 may determine whether each call has been routed correctly based on an identifier/call attributes received from call agent device 208. In different implementations, call agent device 208 may download agent identifiers/call attributes at call testing device 202 and compare them to agent identifiers/call attributes obtained from the forwarded calls. In these implementations, call agent device 208 may not necessarily send a message selected based on the agent identifier/call attributes to call testing device. Furthermore, call agent device 208 may perform post processing.

In another example, while series of blocks have been described with regard to an exemplary process illustrated in FIG. 6, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  automatically placing a call, by a call testing device, to a call routing device based on one of a list of numbers or addresses, wherein the call is to be forwarded by the call routing device to a call agent device;
  establishing a communication session between the call testing device and the call agent device to which the call is forwarded by the call routing device;
  automatically receiving, by the call testing device over the established communication session, from the call agent device, a message that includes an identifier for a virtual call agent;
  extracting, by the call testing device, the identifier from the received message;
  comparing the extracted identifier to an identifier that is associated with the call; and determining whether the call routing device correctly forwarded the call based on the comparison.

2. The method of claim 1, wherein placing a call includes:
initiating a Session Initiation Protocol (SIP) call;
initiating a H.323 call;
initiating a videoconference call;
initiating a videophone call; or
initiating a telephone call.

3. The method of claim 2, wherein initiating the SIP call includes:
initiating a text messaging call; or
initiating a voice-over-Internet Protocol (VoIP) call.

4. The method of claim 1, wherein extracting the identifier includes:
applying speech recognition to the received message to obtain the identifier;
scanning text data from the message to obtain the identifier; or
applying image recognition to the received message to obtain the identifier.

5. The method of claim 1, wherein establishing the communication session includes:
establishing a real-time transport protocol (RTP) session with the call agent device.

6. The method of claim 1, further comprising:
notifying a user of the call testing device of a result of the determining whether the call routing device correctly forwarded the call.

7. A system comprising:
a call testing device to:
place a call directed to a network address or a number,
establish a communication session between the call testing device and a call agent device associated with the network address or the number, via a call routing device that forwards the call from the call testing device to the call agent device,
receive a message during the communication session,
extract a first identifier from the message received during the communication session,
compare the first identifier with a second identifier associated with e call, and
determine whether the call routing device that forwarded the call to the call agent device operates correctly based on the comparison; and
the call agent device to:
receive the call forwarded by the call routing device,
establish the communication session with the call testing device,
determine the first identifier based on the forwarded call,
look up the message based on the first identifier, and
send the message to the call testing device during the communication session.

8. The system of claim 7, further comprising the call routing device to forward the call from the call testing device to the call agent device.

9. The system of claim 8, wherein when the call routing device forwards the call, the call routing device is further configured to one of:
forward a Session Initiation Protocol (SIP) INVITE message received from the call testing device to the call agent device; or
send a SIP REFER message to the call testing device.

10. The system of claim 8, wherein the call routing device includes:
a private branch exchange (PBX) device or automatic call distributor (ACD).

11. The system of claim 7, wherein the call includes a SIP call or a H.323 call.

12. The system of claim 7, wherein the received message includes one of text data or speech data.

13. The system of claim 7, wherein when the call testing device extracts the first identifier, the call testing device is further configured to apply speech recognition to the message to obtain the first identifier.

14. The system of claim 7, wherein the communication session includes a real-time transport protocol (RIP) session.

15. The system of claim 7, wherein before the call agent device determines the first identifier, the call agent device is further configured to receive, from the call routing device, information from which the call agent device determines the first identifier.

16. A device comprising:
a transceiver to:
receive a call, from a call testing device, forwarded by a call routing device,
communicate with the call testing device; and
one or more processors to:
establish a communication session between the device and the call testing device;
select a message based on information received from the call routing device, the information identifying the device, and
send the message over the communication session to the call testing device, to identify a virtual call agent.

17. The device of claim 16, wherein the call includes a Session initiation Protocol (SIP) call, a text messaging session, or a videophone call.

18. The device of claim 16, wherein the message includes an audio message.

19. The device of claim 16, wherein the call routing device includes one of a private branch exchange device or an automatic call distributor.

20. The device of claim 16,
wherein when the one or more processors establish the communication session, the one or more processors are configured to:
receive a Session Initiation Protocol (SIP) INVITE message.

* * * * *